US011263260B2

(12) United States Patent
Voss et al.

(10) Patent No.: US 11,263,260 B2
(45) Date of Patent: Mar. 1, 2022

(54) SEARCHING AND RANKING MODIFIABLE VIDEOS IN MULTIMEDIA MESSAGING APPLICATION

(71) Applicant: Snap Inc., Santa Monica, CA (US)

(72) Inventors: Jeremy Voss, Los Angeles, CA (US); Victor Shaburov, Ocean Village (GI); Aleksandr Mashrabov, Sochi (RU); Dmitriy Matov, Saratov (RU); Hanna Rulevska, Zaporizhia (UA); Dmytro Ishchenko, Kyiv (UA)

(73) Assignee: Snap Inc., Santa Monica, CA (US)

( * ) Notice: Subject to any disclaimer, the term of this patent is extended or adjusted under 35 U.S.C. 154(b) by 0 days.

(21) Appl. No.: 16/835,656

(22) Filed: Mar. 31, 2020

(65) Prior Publication Data

US 2021/0303622 A1  Sep. 30, 2021

(51) Int. Cl.
*G06F 16/732* (2019.01)
*G06F 16/71* (2019.01)
*H04L 12/58* (2006.01)
*H04L 51/10* (2022.01)

(52) U.S. Cl.
CPC .......... *G06F 16/7328* (2019.01); *G06F 16/71* (2019.01); *H04L 51/10* (2013.01)

(58) Field of Classification Search
None
See application file for complete search history.

(56) References Cited

U.S. PATENT DOCUMENTS

| 9,401,947 | B1* | 7/2016 | Oztaskent | G06F 16/9558 |
| 2009/0125511 | A1* | 5/2009 | Kumar | G06Q 10/107 |
| 2012/0304074 | A1* | 11/2012 | Ooi | G06F 3/04895 715/752 |

(Continued)

FOREIGN PATENT DOCUMENTS

WO   2018102880 A1   6/2018

OTHER PUBLICATIONS

Horowitz, Paul, "How to Search and Send GIFs with Messages in iOS", Oct. 17, 2016, https://osxdaily.com/2016/10/17/search-send-gifs-messages-ios/ (date accessed, May 20, 2021) (Year: 2016).*

*Primary Examiner* — Richard L Bowen
(74) *Attorney, Agent, or Firm* — Georgiy L. Khayet (57) ABSTRACT

A system for searching and ranking modifiable videos in a multimedia messaging application (MMA) is provided. In one example embodiment, the system includes a database configured to store modifiable videos, the modifiable videos being associated with text messages and rankings, a processor, and a memory storing processor-executable codes, wherein the processor is configured to implement the following operations upon executing the processor-executable codes: receiving, via the MMA, an input of a user; selecting, based on the input, a list of relevant modifiable videos from the database; rendering, via the MMA, the list of relevant modifiable videos for viewing by the user; determining that the user has shared, via the MMA, a modifiable video from the list; storing an information concerning the list and the shared modifiable video into a statistical log; and updating, based on the information in the statistical log, the rankings of the modifiable videos in the database.

20 Claims, 7 Drawing Sheets

(56) References Cited

U.S. PATENT DOCUMENTS

| | | | |
|---|---|---|---|
| 2015/0161139 A1* | 6/2015 | Wang | G06F 16/24578 707/735 |
| 2019/0139432 A1* | 5/2019 | Jain | G09B 7/00 |
| 2020/0133967 A1* | 4/2020 | Shukla | G06F 16/9538 |

* cited by examiner

| Categories | |
|---|---|
| Recent | Reel_A_1, Reel_A_2, Reel_A_3, ... |
| Featured | Reel_B_1, Reel_B_2, Reel_B_3, ... |
| Greetings | Reel_C_1, Reel_C_2, Reel_C_3, ... |
| Love | Reel_D_1, Reel_D_2, Reel_D_3, ... |
| Happy | Reel_E_1, Reel_E_2, Reel_E_3, ... |
| Upset | Reel_F_1, Reel_F_2, Reel_F_3, ... |
| Celebration | Reel_G_1, Reel_G_2, Reel_G_3, ... |

} Updated per schedule based on rankings of reels in database

SEARCHING AND RANKING MODIFIABLE VIDEOS IN MULTIMEDIA MESSAGING APPLICATION

TECHNICAL FIELD

This disclosure generally relates to multimedia messaging applications (MMAs) and, more particularly, to searching and ranking modifiable videos in MMAs.

BACKGROUND

Sharing media, such as stickers and emojis, has become a standard option in MMAs. Currently, some of the MMAs provide users with an option users to exchange short videos via a communication chat. These short videos can be pre-generated and stored in a database and provided to MMAs on demand.

BRIEF DESCRIPTION OF THE DRAWINGS

Embodiments are illustrated by way of example and not limitation in the figures of the accompanying drawings, in which like references indicate similar elements.

DETAILED DESCRIPTION

The following detailed description of embodiments includes references to the accompanying drawings, which form a part of the detailed description. Approaches described in this section are not prior art to the claims and are not admitted prior art by inclusion in this section. The drawings show illustrations in accordance with example embodiments. These example embodiments, which are also referred to herein as "examples," are described in enough detail to enable those skilled in the art to practice the present subject matter. The embodiments can be combined, other embodiments can be utilized, or structural, logical and operational changes can be made without departing from the scope of what is claimed. The following detailed description is, therefore, not to be taken in a limiting sense, and the scope is defined by the appended claims and their equivalents.

The disclosure provided herein is directed to searching and ranking reels used in an MMA. A reel, also referred to herein as modifiable video, can include a short movie or a video clip. The MMA is an application that can be executed on a personal computing device (PCD), such as a smartphone, a tablet, a laptop, and so forth. The MMA can enable communication chats, which can be used by users of the PCD to exchange messages and personalized videos generated from the reels.

The reels can be generated by the developer of the MMA and stored in a database. The database can reside in a computing cloud. While using the MMA, a user can view reels under various categories such as, for example, "Recent," "Featured," "Greetings," "Love," "Happy," "Upset," "Celebration," and so forth. The "Recent" category can be personalized for the user and include reels recently shared by the user with other users. In one embodiment, the number of reels in the "Recent" category may be limited to a pre-determined number. If the number of recently shared reels is less than the pre-determined number, the rest of the positions of the "Recent" category can be filled with reels from the "Featured" category.

The MMA may also include a "Search" option. Upon selecting the "Search" option, the user may be able to type a search request including one or more keywords. Upon submission of the search request and getting a response back, the user may review a list of reels found in the database and returned in the response to the search request. The search of the reels can be performed based on rankings of the reels.

In some example embodiments, the user may select a reel from the categories or the search results and share the selected reel via the communication chat. The selected reel may include frames and some of the frames may include an area designated for a facial image. The facial image can be also referred to as a selfie. The MMA may allow the user to generate the selfie using a camera application associated with the PCD or a photograph provided by the user. The selfie can be inserted into the area in the frame. The frame may include a set of facial parameters representing a facial expression. While being inserted into the frame, the selfie can adopt the facial expression. When the reel is played back, the selfie can change the facial expression across the frames of the reel. The selected reel may include a pre-generated text message. Prior to sending the reel via the communication chat, the user can modify the text message and style of the text message.

Some embodiments of the disclosure provided herein are directed to updating lists of reels in categories. For example, the MMA may update lists in the categories according to a pre-determined schedule. The update may include adding new reels to the categories. The update may also include refreshing the rest of the lists of reels in the categories based on the current rankings of the reels in the database. The rankings of the reels in the database can be updated based on statistics collected from users. These statistics may include a conversion rate for each of the reels. The conversion rate for a reel can be determined as a ratio of the number of times the users send the reel via the communication chat to a number of views of the reel by users. The statistics can be updated each time the user views the reels in the categories and incremented if the user sends a reel or decremented if the user does not send the reel via the communication chat.

In some example embodiments, the rankings of the reels can be determined based on three factors: relevance, popularity, and freshness. The relevance can be determined as a measure of matching a reel to a certain category. The popularity can be based on the conversion rate of the reel. The freshness can be based on the time elapsed since the reel was created and stored to the database. The rankings of the reels can be based on a specific combination of weighted factors. The specific combination that matches the intent of the users can be determined, for example, experimentally or based on historical data. The specific combination can be also determined based on user logs and user feedback.

Some embodiments of the disclosure may include updating the algorithm for searching reels in response to user requests. The MMA may also include a search engine for executing the algorithm for searching reels in the database. The search engine can reside either on the PCD or in a computing cloud.

The reels stored in the database can be assigned attributes to facilitate searches. The attributes may include a time of creation of a reel, ranking of the reel, search tags, and search descriptions. Updating the algorithm for searching may include updating the rankings of reels in the database and adjusting search tags and search descriptions of the reels to match the intent of users in the user requests. The search tags and search descriptions may be deleted, edited, or added.

The algorithm for searching the reels can be based on one or more models using machine learning, such as artificial neural network (ANN), decision trees, support vector machine (SVM), regression analysis, and so forth. The training set for the models can be based on user logs and user feedback. For example, a log may include the following: user request→list of reels found in response to user request-→list of the reels viewed by the user→the reel sent by the user or indication that no reels were sent. Based on the user logs, a set of pairs of reels can be created, each pair including a first reel and a second reel. The first reel can include the reel reviewed and sent by the user after the user request. The second reel can include the reel reviewed but not sent by the user after the user request. The set of pairs can be then used to train a model for a search algorithm.

Some example embodiments of the disclosure can also include techniques for comparisons of two search algorithms. The first comparison technique can include an A/B test. Search algorithm A and search algorithm B can be tested simultaneously using two groups of users during a test period (for example, a week). A metric can be computed based on user logs for each algorithm. The metrics may be based on a ratio of the number of reels sent by users after the search requests to the number of search requests processed by the search algorithm. If the metrics of the search algorithm A are higher than the metrics of the search algorithm B, the search engine can be updated to use the search algorithm A.

The second comparison technique can be based on packs of various experimental requests and responses to the requests. The responses to the requests can include lists of reels. The reels in the lists can be ranked by a reference algorithm. The same packs of requests can be processed by a first search algorithm to obtain a first pack of responses, where the responses include lists of reels ranked by the first search algorithm. A first metric can be calculated based on the differences between the rankings of the reels determined by the reference algorithm and the rankings of the reels determined by first search algorithm. Similarly, the packs of requests can be processed by a second search algorithm to obtain a second pack of response, where the responses include lists of reels ranked by the second search algorithm. A second metric can be calculated based on the differences in the rankings of the reels determined by the reference algorithm and the rankings of the reels determined by the second search algorithm. If the first metric is lower than the second metric, the search engine can be updated to use the first search algorithm. If the second metric is lower than the first metric, the search engine can be updated to use the second search algorithm.

The third comparison technique can be based on an evaluation of a quality of results of two search algorithms. First, a set of requests can be generated. The set of requests may include, for example, 50-100 search requests for reels. Then, each request can be processed by a first search algorithm to obtain a first list of reels and by a second search algorithm to obtain a second list of reels. The first list of reels and the second list of reels can be compared to determine which list is of a better quality. Accordingly, a first counter is increased if the first search algorithm produces a list of a better quality or a second counter is increased if the second algorithm produces a list of a better quality. After repeating the procedure for all requests in the set, the algorithm having a bigger counter can be selected to update the search engine.

Figure 1:
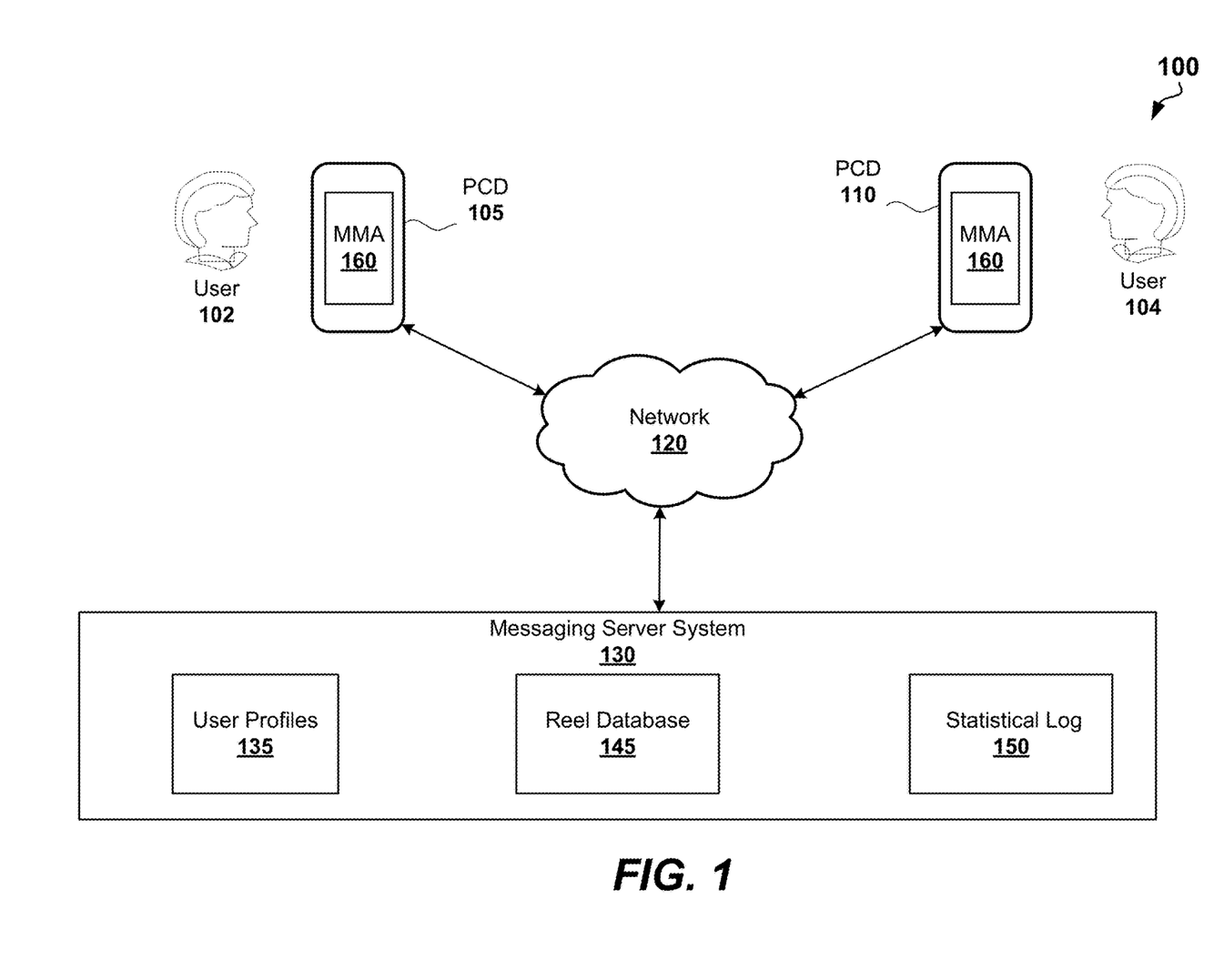
FIG. 1 is a block diagram showing an example environment wherein systems and methods for searching and ranking modifiable videos in MMAs can be implemented.

FIG. 1 shows an example environment 100, wherein a method for searching and ranking modifiable videos can be practiced. The environment 100 may include a PCD 105, a user 102, a PCD 110, a user 104, a network 120, and messaging server system (MSS) 130. The PCD 105 and PCD 110 can refer to a mobile device such as a mobile phone, smartphone, or tablet computer. In further embodiments, however, the PCD 110 can refer to a personal computer, laptop computer, netbook, set top box, television device, multimedia device, personal digital assistant, game console, entertainment system, infotainment system, vehicle computer, or any other computing device.

The PCD 105 and the PCD 110 can be communicatively connected to the MSS 130 via the network 120. The MSS 130 can be implemented as a cloud-based computing resource(s). The MSS 130 can include computing resource (s) (hardware and software) available at a remote location and accessible over a network (e.g., the Internet). The cloud-based computing resource(s) can be shared by multiple users and dynamically re-allocated based on demand. The cloud-based computing resources can include one or more server farms/clusters including a collection of computer servers which can be co-located with network switches or routers.

The network 120 may include any wired, wireless, or optical networks including, for example, the Internet, intranet, local area network (LAN), Personal Area Network (PAN), Wide Area Network (WAN), Virtual Private Network (VPN), cellular phone networks (e.g., Global System for Mobile (GSM) communications network, and so forth.

In some embodiments of the disclosure, the PCD 105 and PCD 110 may include MMA 160 configured to enable a communication chat between the user 102 and the user 104. The user 102 and the user 104 may exchange text message and videos during the communication chat. The videos may include personalized videos. The personalized videos can be generated based on reels stored in the PCD 105 or the PCD 110. In some embodiments, the reels can be stored in the MSS 130 and downloaded to the PCD 105 or the PCD 110 via MMA 160 on demand.

The MSS 130 may include a reel database 145 for storing the reels. The reels can be generated based on animation videos or live action videos. The reels can be downloaded to the PCD 105 or the PCD 110. The MSS 130 may include a statistical log 150 for storing statistics of downloads of the reels to determine popularity metrics for the video templates. The popularity metrics can be divided into categories based on an age of user, gender of user, geographical region, and so forth. The statistical log 150 may also store statistics of sharing the reels by users of PCD 105 and PCD 110 via MMA 160.

The MSS 130 may be also configured to store user profiles 135. The user profiles 135 may include images of the face of the user 102, images of the face of the user 104, and images of faces of other persons. The images of the faces can be downloaded to the PCD 105 or the PCD 110 on demand and based on permissions. Additionally, the images of the face of the user 102 can be generated using the PCD 105 and stored in a local memory of the PCD 105. The images of the faces can be generated based on other images stored in the PCD 105. The images of the faces can be further used by the PCD 105 to generate personalized videos based on the reels. Similarly, the PCD 110 may be used to generate images of the face of the user 104. The images of the face of the user 104 can be used to generate, from the reels, personalized videos on the PCD 110.

In further embodiments, the images of the face of user 102 and images of the face of the user 104 can both be used to generate personalized videos on the PCD 105 or the PCD 110.

In some embodiments, a reel may include a preset default text message. The reel may further include preset text parameters for animation of the preset default text message in a personalized video generated based on the reel. The PCD 105 and PCD 110 can be configured to play back the personalized video featuring the preset text message animated based on the preset text parameters. During the playback of the personalized video, the MMA 160 may provide an option to change the preset default text message and parameters for displaying the text message in the personalized video. The PCD 105 may dynamically change the preset default text message in the personalized video while the personalized video is played back. The user 105 may then send the personalized video with the changed text message to the user 104 of the PCD 110 via MMA 160.

Figure 2:
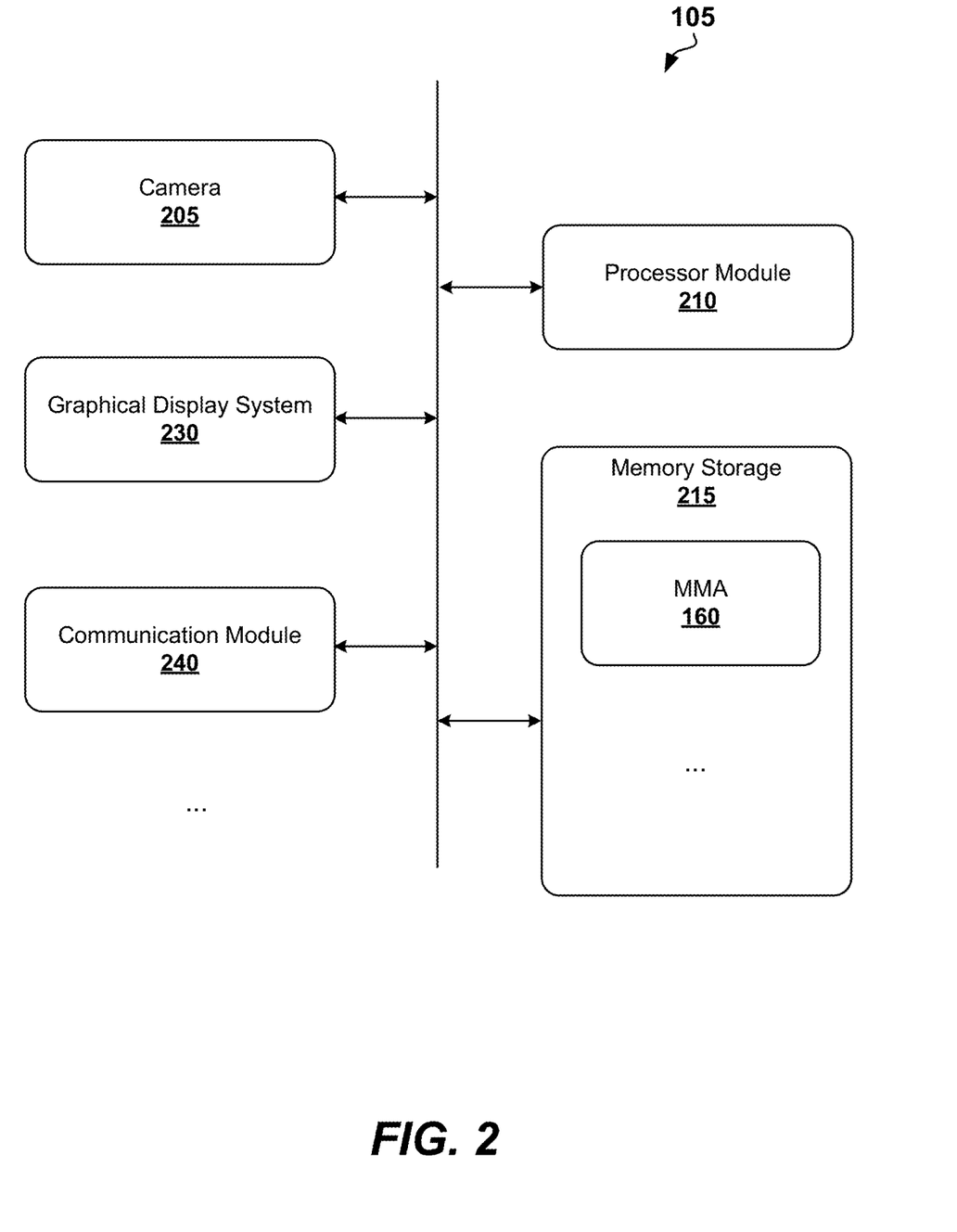
FIG. 2 is a block diagram showing an example embodiment of a computing device for implementing methods for searching and ranking modifiable videos.

FIG. 2 is a block diagram showing an example embodiment of a PCD 105 (or PCD 110) for implementing methods for searching and ranking reels. In the example shown in FIG. 2, the PCD 105 includes both hardware components and software components. Particularly, the PCD 105 includes a camera 205 or any other image-capturing device or scanner to acquire digital images. The PCD 105 can further include a processor module 210 and a memory storage 215 for storing software components and processor-readable (machine-readable) instructions or codes, which, when performed by the processor module 210, cause the PCD 105 to perform at least some steps of methods for searching and ranking modifiable videos as described herein. The PCD 105 may include graphical display system 230 and a communication module 240. In other embodiments, the PCD 105 may include additional or different components. Moreover, the PCD 105 can include fewer components that perform functions similar or equivalent to those depicted in FIG. 2.

The PCD 105 can further include an MMA 160. The MMA 160 may be implemented as software components and processor-readable (machine-readable) instructions or codes stored in the memory storage 215, which when performed by the processor module 210, cause the PCD 105 to perform at least some steps of methods for providing communication chats, generation of personalized videos, and searching reels for personalized videos as described herein. A user interface of the MMA 160 can be provided via the graphical display system 230. The communication chats can be enabled by MMA 160 via the communication module 240 and the network 120. The communication module 240 may include a GSM module, a WiFi module, a Bluetooth™ module and so forth.

Figure 3:
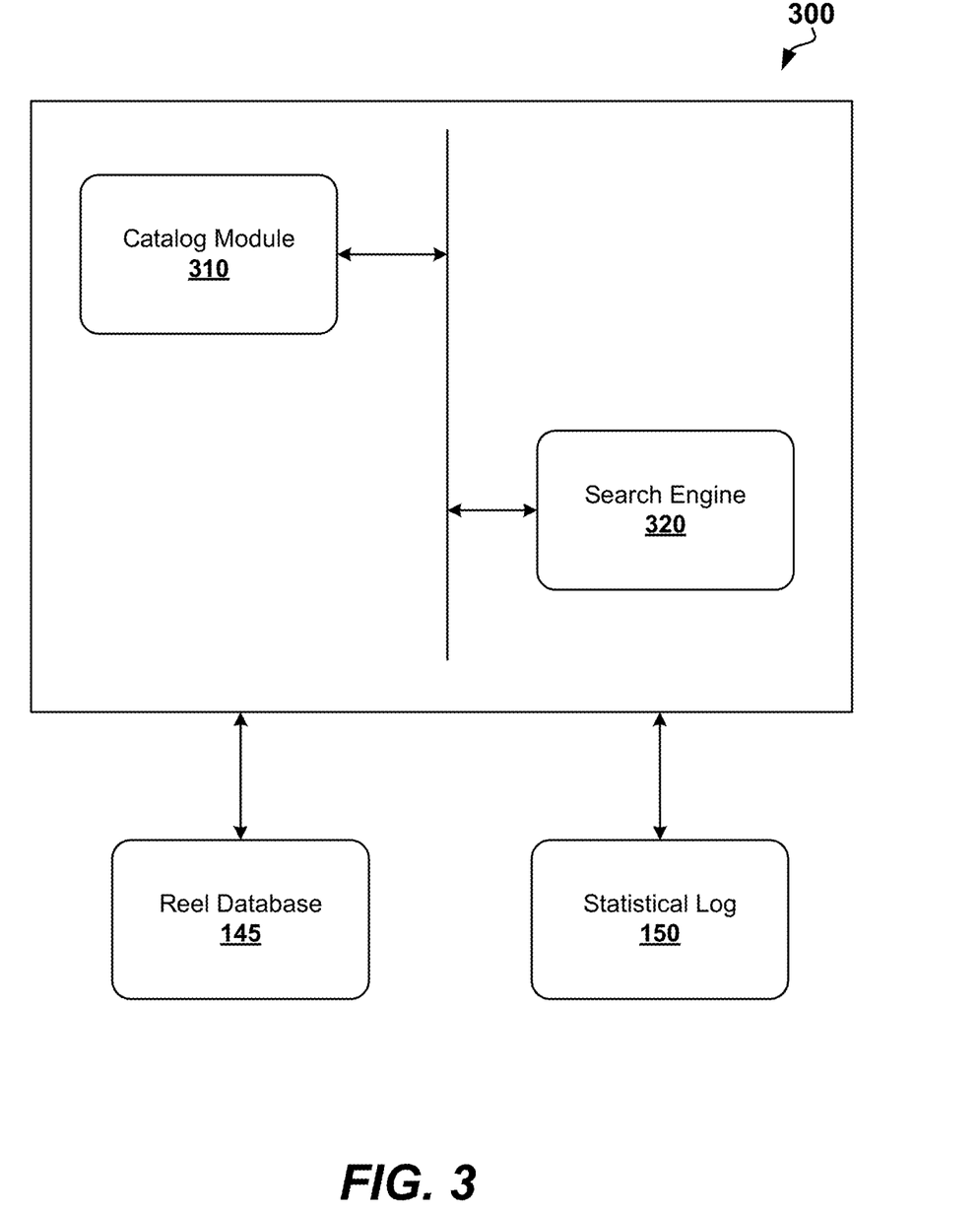
FIG. 3 is a block diagram showing a system for ranking and searching modifiable videos, according to some example embodiments of the disclosure.

FIG. 3 is a block diagram showing an example system 300 for searching and ranking modifiable videos, according to an example embodiment. The system 300 may include a catalog module 310 and a search engine 320. The system 300 may reside in MSS 130.

The catalog module 310 can be configured to provide lists of reels. Each of the lists may include reels matching a certain category and having highest rankings among the reels in the reel database 145. The catalog module 310 may determine rankings of the reels based on information in statistical log 150. The rankings can be based on popularity metrics. The popularity metrics can be based on a ratio of a number of times users shared, via the MMA 160, a personalized video generated based on the reel in communications chats to a number of views of the modifiable video by users of the MMA.

Figure 4:
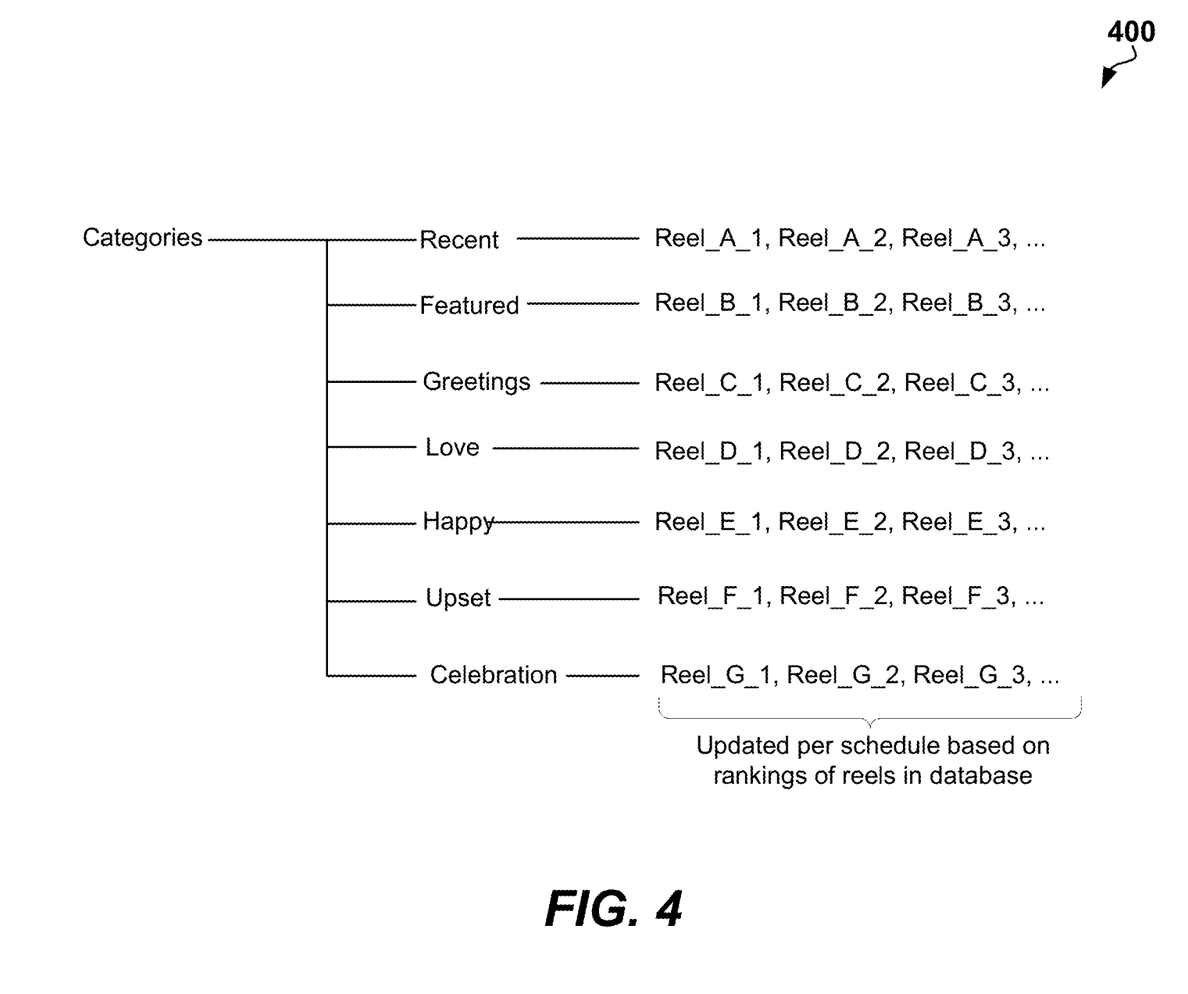
FIG. 4 is a schematic diagram showing categories of modifiable videos, according to some example embodiments of the disclosure.

FIG. 4 shows categories of reels, according to some example embodiments. A user of MMA 160 can view reels under categories "Recent," "Featured," "Greetings," "Love," "Happy," "Upset," and "Celebration." The "Recent" category can be personalized for the user and include reels recently shared by the user with other users. The number of reels in each category can be limited to a pre-determined number. If the number of recently shared reels is less than the pre-determined number, missing reels in the "Recent" category can be filled with reels from the "Featured" category. The "Featured" category can be filled with reels having highest rankings among all reels in the reel database 145.

The reels in the reel database 145 may include the following attributes: search tags, search description, and a time at which the reel was added to the reel database. The catalog module 310 can periodically update rankings of reels in the reel database and lists of categories of reels according to a pre-determined schedule (for example, daily or weekly). The catalog module 310 can determine that a reel from the reel database 145 matches a certain category based on matching the category to the search tags and search description of the reel. In some embodiments, a predetermined number of positions in the lists of categories of reels can be filled with reels matching the categories and recently added to the reel database 145. The rest of the positions in the lists can be filled by reels having highest rankings in the reel database 145. The updated lists of categories of reels can be sent to the MMA 160.

The search engine 320 may receive a request from the MMA. The request may include one or more keywords. The search engine 320 can perform a search in reel database 145 to determine a list of relevant reels matching the keywords.

Figure 5:
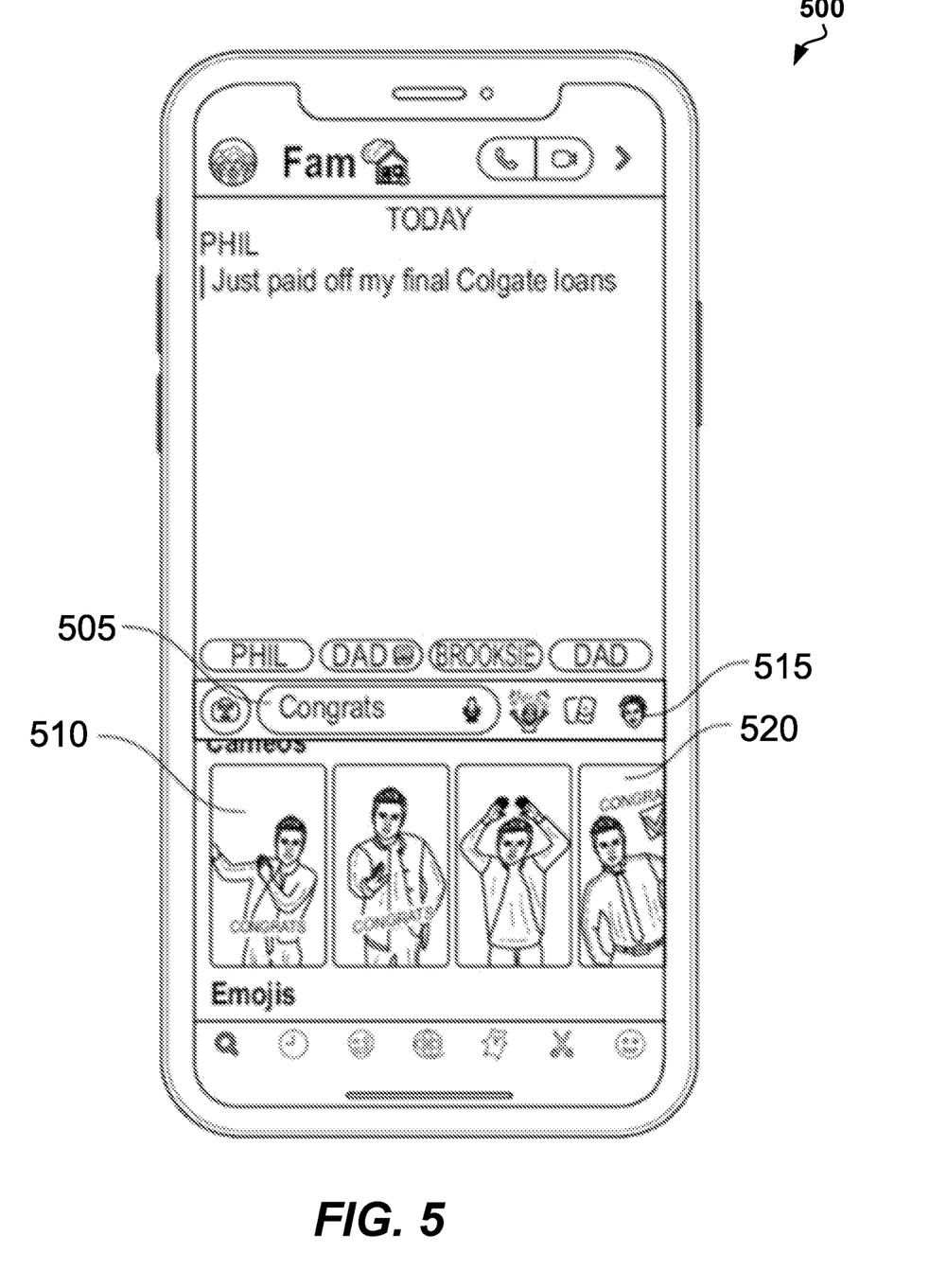
FIG. 5 shows an example screen of a communication chat in an MMA, according to an example embodiment of the disclosure.

FIG. 5 shows an example screen 500 of a communication chat provided by MMA 160, according to an example embodiment of the disclosure. Tapping on a quick search icon 515 may open a sticker picker on a search tab 520. The search tab 520 may allow a user of MMA 160 to select one of personalized videos 510. The personalized videos 510 can be generated from reels determined by search tab 520 based on keywords the user types in a search string 505. A selfie of the user can be inserted in the personalized videos 510 and may have emotional reenactment and some visual elements around it according to facial expression parameters specified in the reels. The list of personalized videos 510 is updated each time the user changes the keywords in the search string 505.

In one embodiment, the search engine 320 may select reels from the reel database 145 based on rankings of reels. The rankings of reels used by the search engine 320 can be different from rankings of reels used by the catalog module 310. Rankings of reels used by the search engine 320 can be determined based on a weighted sum of a relevance factor, a freshness factor, and a popularity factor. The relevance factor can be based on a measure of matching search tags and a search description of the modifiable video to the keywords in a search string. The freshness factor can be based on a time at which the modifiable video was added to the reel database 145. The popularity factor is based on a ratio of a number of times users shared the modifiable video via the MMA to a number of views of the modifiable video by users of the MMA. Weights of the relevance factor, the freshness factor, and the popularity factor can be determined based on historical data in statistical log 150. The specific combination of weights can be also determined based and a user feedback.

In some embodiments, the statistical log 150 and a user feedback can be used to adjust search tags and search descriptions of the reels to match the intent of users in the user requests. The search tags and search descriptions may be deleted, edited, or added.

In certain embodiments, the search engine 320 may apply a search algorithm for selecting most relevant reels in response to the user requests specified by keywords. The search can be based on one or more models using machine learning, such as artificial neural network (ANN), decision trees, SVM, regression analysis, and so on. The training set for the models can be generated based on statistical log 150 and user feedback.

In some embodiments, the statistical log 150 may include the following records: user request→list of reels found in response to user request→list of the reels viewed by the user→the reel sent by the user via MMA 160 or indication that no reels were sent. The records can be collected from PCDs of a group of users.

Based on the statistical log 150, a set of pairs of reels can be created, each pair including a first reel and a second reel. The first reel is the reel reviewed and sent by the user after the user request. The second reel is the reel reviewed and not sent by the user after the user request. The set of pairs is then used to train the models for a search algorithm.

Some example embodiments of the disclosure can also include techniques for comparisons of two search algorithms. In one embodiment, the comparison technique includes an A/B test. Search algorithm A and search algorithm B can be tested synchronously on two groups of users during a test period (for example, for a week). For each algorithm, a metric can be computed based on the statistical log 150 collected during the week. The metrics may be based on a ratio of the number of reels sent by users after the search requests to the number of search requests processed by the search algorithm. If the metric of the search algorithm A is higher than the metric of the search algorithm B, the search engine 320 can be updated to use the search algorithm A. If the metric of the search algorithm B is higher than the metric of the search algorithm A, the search engine 320 can be updated to use the search algorithm B.

In another example embodiment, the comparison technique can be based on a pack of various experimental requests $\{R\}=\{R1, R2, \ldots, Rn\}$ and responses to the requests $\{Ref\_Reels\}=\{\{Ref\_Reel\_11, Ref\_Reel\_12, \ldots, Ref\_Reel\_1m\}, \{Ref\_Reel\_21, Ref\_Reel\_22, \ldots, Ref\_Reel\_2m\}, \ldots, \{Ref\_Reel\_N1, Ref\_Reel\_N2, \ldots, Ref\_Reel\_Nm\}\}$. The responses $\{Ref\_Reels\}$ to the requests $\{R\}$ can be generated using a reference algorithm. The reference algorithm may determine rankings of the reels in responses and order the reels according to the rankings. As noted above, the rankings can be determined as a weighted sum of a relevance factor, a freshness factor, and a popularity factor, where the relevance factor depends on the keywords in requests.

The reference algorithm can be trained on a set of ordered pairs of reels $\{(Reel\_k\_1; Reel\_k\_2)\}$, $k=1, \ldots, N$, where Reel_k_1 is assigned a higher ranking than the Reel_k_2. The set of ordered pairs of reels can be generated, for example, by manually inspecting pairs of reels that match keywords in requests $\{R\}$, determining which reels in the pairs should have a higher ranking and ordering the reels in pairs.

The same packs of requests $\{R\}$ can be processed by a first search algorithm to obtain a first pack of responses $\{A\_Reels\}=\{\{A\_Reel\_11, A\_Reel\_12, \ldots, A\_Reel\_1m\}, \{A\_Reel\_21, A\_Reel\_22, \ldots, A\_Reel\_2m\}, \ldots, \{A\_Reel\_N1, A\_Reel\_N2, \ldots, A\_Reel\_Nm\}\}$, where the responses include lists of reels generated and ordered by the first search algorithm. A first metric can be calculated based on the differences in the responses $\{Ref\_Reels\}$ determined by the reference algorithm and the responses $\{A\_Reels\}$ determined by the first search algorithm.

Similarly, the packs of requests $\{R\}$ can be processed by a second search algorithm to obtain a second pack of responses $\{B\_Reels\}=\{\{B\_Reel\_11, B\_Reel\_12, \ldots, B\_Reel\_1m\}, \{B\_Reel\_21, B\_Reel\_22, \ldots, B\_Reel\_2m\}, \ldots, \{B\_Reel\_N1, B\_Reel\_N2, \ldots, B\_Reel\_Nm\}\}$, where the responses include lists of reels generated and ordered by the second search algorithm. A second metric can be calculated based on the differences in in the responses $\{Ref\_Reels\}$ determined by the reference algorithm and the responses $\{B\_Reels\}$ determined by the second search algorithm. If the first metric is lower than the second metric, the search engine 320 can be updated to use the first search algorithm. If the second metric is lower than the first metric, the search engine 320 can be updated to use the second search algorithm.

In yet another example embodiment, the comparison technique can be based on evaluation of quality of results of two search algorithms. First, a set of requests $\{R\}=\{R1, R2, \ldots, Rn\}$ can be generated. The set of requests $\{R\}$ may include, for example, 50-100 search requests. The search requests may include different keywords.

Each of requests Ri, $i=1, \ldots, n$, can be processed by a first search algorithm to obtain a first list of reels $\{A\_Reel\_i\}=\{A\_Reel\_1\_i, A\_Reel\_2\_i, \ldots, A\_Reel\_m\_i\}$ and by a second search algorithm to obtain a second list of reels $\{B\_Reel\_i\}=\{B\_Reel\_1\_i, B\_Reel\_2\_i, \ldots, B\_Reel\_m\_i\}$. The first list of reels $\{A\_Reel\_i\}$ and the second list $\{B\_Reel\_i\}$ can be compared to determine which of the lists has a better quality. The estimation of quality of the first list of reels $\{A\_Reel\_i\}$ and the second list $\{B\_Reel\_i\}$ can be performed manually.

If list $\{A\_Reel\_i\}$ has a better quality than the list $\{B\_Reel\_i\}$, a first counter C_A is increased. If list $\{B\_Reel\_i\}$ has a better quality than the list $\{B\_Reel\_i\}$, a second counter C_B is increased. The procedure is repeated for all requests in the set $\{R\}$. If C_A>C_B, the search engine 320 is updated with the first search algorithm. If C_B>C_A, the search engine 320 is updated with the second search algorithm.

Figure 6:
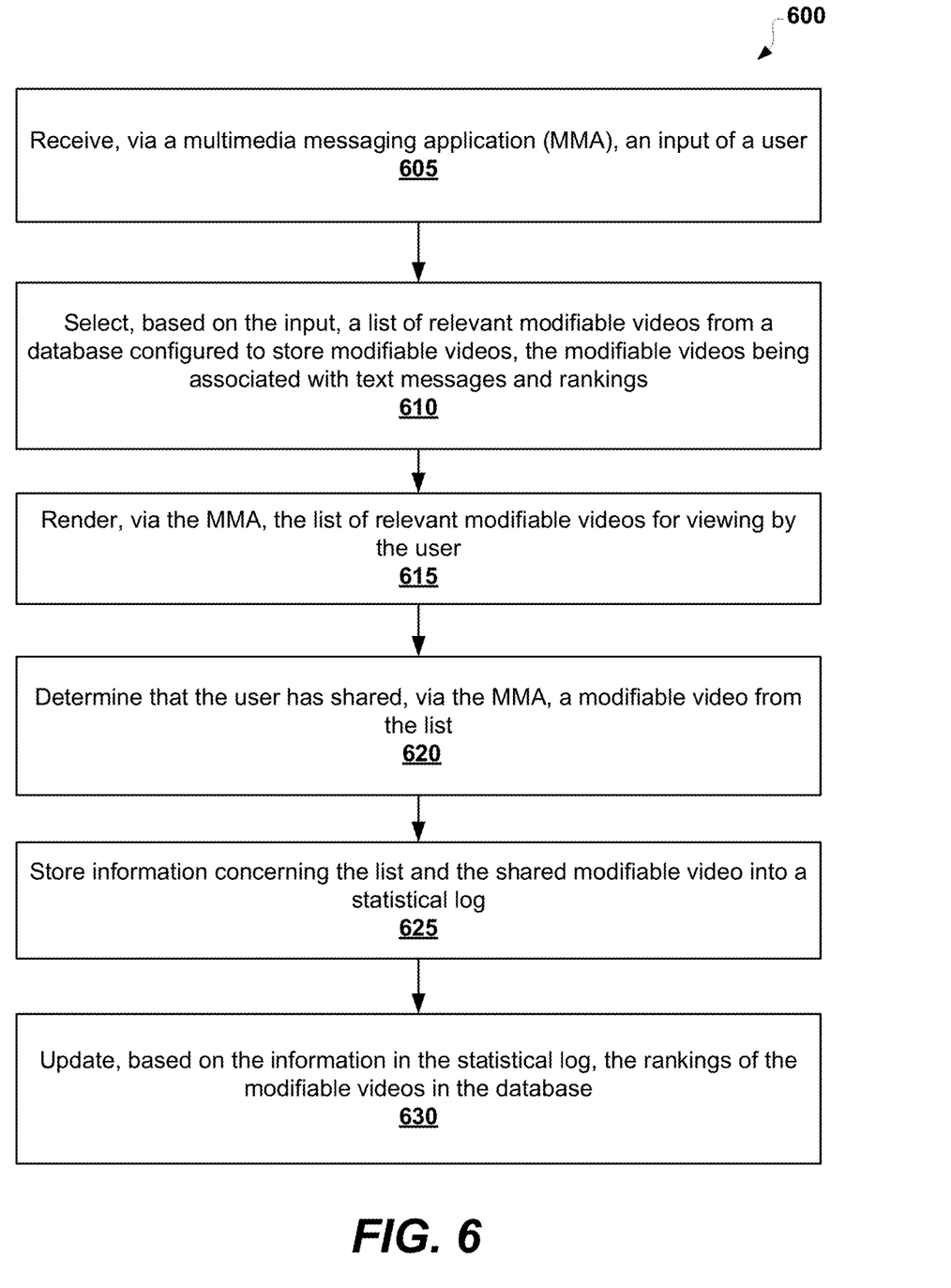
FIG. 6 is a flow chart showing a method for searching and ranking modifiable videos in MMAs, in accordance with an example embodiment.

FIG. 6 is a flow chart showing a method 600 for selecting and ranking modifiable videos, according to some example embodiments. The method 600 can be implemented within example environment 100 described with reference to FIG. 1 by system 300 described with reference to FIG. 3.

The method 600 may commence, in block 605, with receiving, via an MMA, an input of a user. In one embodiment, the input can include a category of the modifiable video. In another embodiment, the input can include a search request. The search request can include at least one keyword.

In block 610, the method 600 may select, based on the input, a list of relevant modifiable videos from a database configured to store modifiable videos. The modifiable videos can be associated with text messages and rankings. If the input includes a category, the list of relevant modifiable videos can include the modifiable videos matching the category. A category can be based on a time a modifiable video was shared via the MMA, a number of times users shared the modifiable video via the MMA, and an emotional state associated with the text message of the modifiable video.

The list of relevant modifiable videos for the category can be updated according to a pre-determined schedule (for example, daily or weekly). Updating the list can be performed by filling a pre-determined first position of the list with the modifiable video most recently added to the database and filling the rest of the positions in the list by the modifiable videos having the highest rankings. The rankings of the modifiable videos can be based on a ratio of the number of times users shared the modifiable video via the MMA to the number of views of the modifiable video by users of the MMA.

If the input includes the search request, the list of relevant modifiable videos can be selected, by a search algorithm, from the modifiable videos with the highest rankings. In this case, the rankings of the modifiable videos can be based on the keyword in the search request. For example, a ranking of a modifiable video can be based on a weighted sum of a relevance factor, freshness factor, and popularity factor. The relevance factor can be based on a degree of matching search tags and a search description of the modifiable video to the least one keyword. The freshness factor can be based on a time at which the modifiable video is added to the database. The popularity factor can be based on a ratio of a number of times users shared the modifiable video via the MMA to a number of views of the modifiable video by users of the MMA. Weights for the relevance factor, the freshness factor, and the popularity factor can be determined by a machine learning model based on historical data from the statistical log.

In block 615, the method 600 may render, via the MMA, the list of relevant modifiable videos for viewing by the user. The MMA may store information concerning the modifiable videos that were viewed by the user.

In block 620, the method 600 may determine that the user has shared, via the MMA, a modifiable video from the list. The MMA may store information concerning the modifiable video shared by the user via the MMA.

In block 625, the method 600 may store information concerning the list and the shared modifiable video to a statistical log. The information may include a record with the input having the category or the search request, the list of modifiable videos that were presented to the user in response to the input, the modifiable video from the list shared by the user via MMA, or an indication that the user has not shared any modifiable videos from the list.

In block 630, the method 600 may update, based on the information in the statistical log, the rankings of the modifiable videos in the database. The rankings of the modifiable videos can be updated by adjusting the search tags or the search descriptions of the modifiable videos. The statistical log can be also used to update the search algorithm. For example, the statistical log can be used to update the weights for the relevance factor, freshness factor, and popularity factor.

Figure 7:
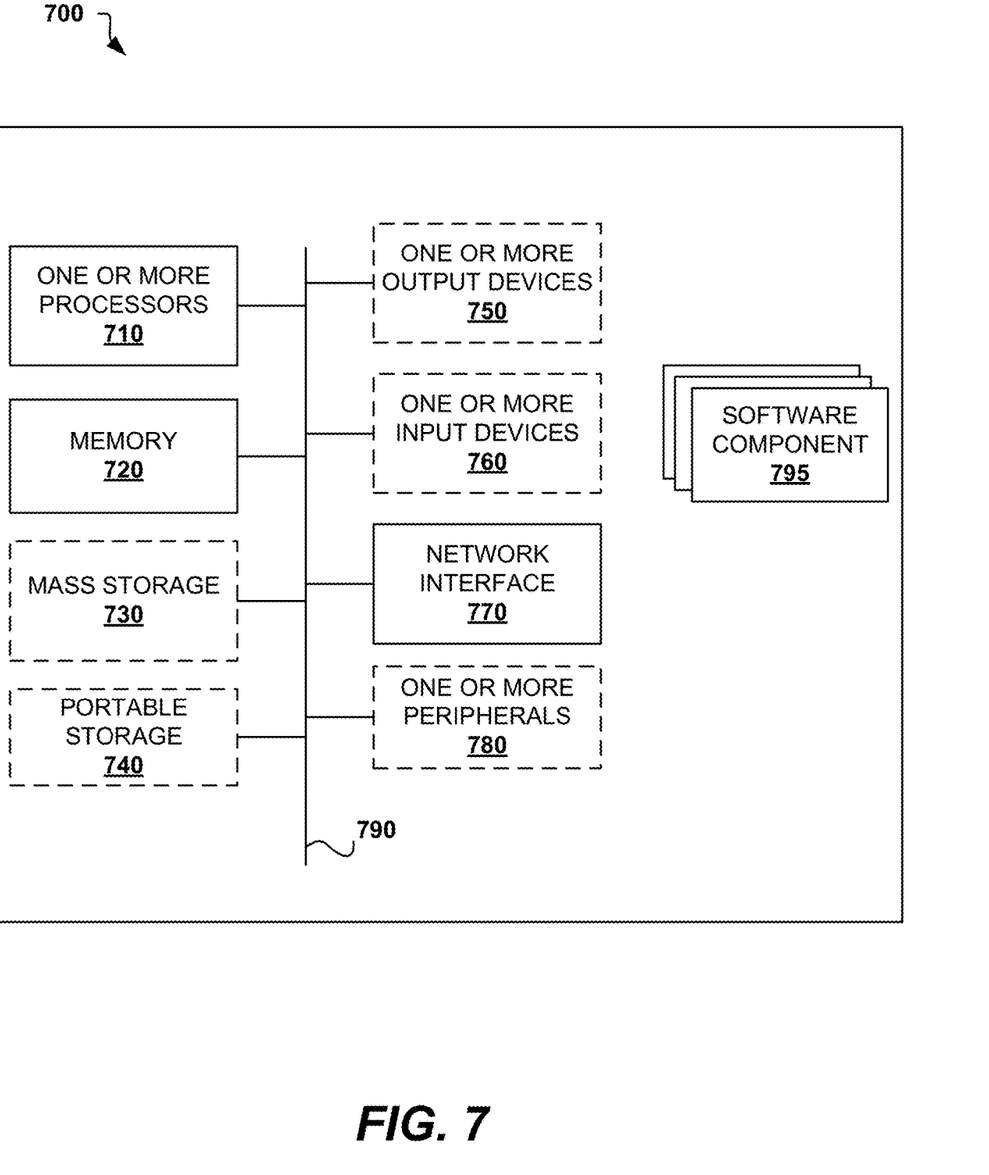
FIG. 7 shows an example computer system that can be used to implement methods for searching and ranking modifiable videos.

FIG. 7 illustrates an example computing system 700 that can be used to implement methods described herein. The computing system 700 can be implemented in the contexts of the likes of PCD 105 and 110, the MSS 130, the MMA 160, and the system 300 for searching and ranking of modifiable videos.

As shown in FIG. 7, the hardware components of the computing system 700 may include one or more processors 710 and memory 720. Memory 720 stores, in part, instructions and data for execution by processor 710. Memory 720 can store the executable code when the system 700 is in operation. The system 700 may further include an optional mass storage device 730, optional portable storage medium drive(s) 740, one or more optional output devices 750, one or more optional input devices 760, an optional network interface 770, and one or more optional peripheral devices 780. The computing system 700 can also include one or more software components 795 (e.g., ones that can implement the method for providing personalized videos as described herein).

The components shown in FIG. 7 are depicted as being connected via a single bus 790. The components may be connected through one or more data transport means or data network. The processor 710 and memory 720 may be connected via a local microprocessor bus, and the mass storage device 730, peripheral device(s) 780, portable storage device 740, and network interface 770 may be connected via one or more input/output (I/O) buses.

The mass storage device 730, which may be implemented with a magnetic disk drive, solid-state disk drive, or an optical disk drive, is a non-volatile storage device for storing data and instructions for use by the processor 710. Mass storage device 730 can store the system software (e.g., software components 795) for implementing embodiments described herein.

Portable storage medium drive(s) 740 operates in conjunction with a portable non-volatile storage medium, such as a compact disk (CD) or digital video disc (DVD), to input and output data and code to and from the computing system 700. The system software (e.g., software components 795) for implementing embodiments described herein may be stored on such a portable medium and input to the computing system 700 via the portable storage medium drive(s) 740.

The optional input devices 760 provide a portion of a user interface. The input devices 760 may include an alphanumeric keypad, such as a keyboard, for inputting alphanumeric and other information, or a pointing device, such as a mouse, a trackball, a stylus, or cursor direction keys. The input devices 760 can also include a camera or scanner. Additionally, the system 700 as shown in FIG. 7 includes optional output devices 750. Suitable output devices include speakers, printers, network interfaces, and monitors.

The network interface 770 can be utilized to communicate with external devices, external computing devices, servers, and networked systems via one or more communications networks such as one or more wired, wireless, or optical networks including, for example, the Internet, intranet, LAN, WAN, cellular phone networks, Bluetooth radio, and an IEEE 802.11-based radio frequency network, among others. The network interface 770 may be a network interface card, such as an Ethernet card, optical transceiver, radio frequency transceiver, or any other type of device that can send and receive information. The optional peripherals 780 may include any type of computer support device to add additional functionality to the computer system.

The components contained in the computing system 700 are intended to represent a broad category of computer components. Thus, the computing system 700 can be a server, personal computer, hand-held computing device, telephone, mobile computing device, workstation, minicomputer, mainframe computer, network node, or any other computing device. The computing system 700 can also include different bus configurations, networked platforms, multi-processor platforms, and so forth. Various operating systems (OS) can be used including UNIX, Linux, Windows, Macintosh OS, Palm OS, iOS, Android, and other suitable operating systems.

Some of the above-described functions may be composed of instructions that are stored on storage media (e.g., computer-readable medium or processor-readable medium). The instructions may be retrieved and executed by the processor. Some examples of storage media are memory devices, tapes, disks, and the like. The instructions are operational when executed by the processor to direct the processor to operate in accord with the disclosure. Those skilled in the art are familiar with instructions, processor(s), and storage media.

It is noteworthy that any hardware platform suitable for performing the processing described herein is suitable for use with the disclosure. The terms "computer-readable storage medium" and "computer-readable storage media" as used herein refer to any medium or media that participate in providing instructions to a processor for execution. Such media can take many forms, including, but not limited to, non-volatile media, volatile media, and transmission media. Non-volatile media include, for example, optical or magnetic disks, such as a fixed disk. Volatile media include dynamic memory, such as system random access memory (RAM). Transmission media include coaxial cables, copper wire, and fiber optics, among others, including the wires that include one embodiment of a bus. Transmission media can also take the form of acoustic or light waves, such as those generated during radio frequency (RF) and infrared (IR) data communications. Common forms of computer-readable media include, for example, a floppy disk, a flexible disk, a hard disk, magnetic tape, any other magnetic medium, a CD-read-only memory (ROM) disk, DVD, any other optical medium, any other physical medium with patterns of marks or holes, a RAM, a PROM, an EPROM, an EEPROM, any other memory chip or cartridge, a carrier wave, or any other medium from which a computer can read.

Various forms of computer-readable media may be involved in carrying one or more sequences of one or more instructions to a processor for execution. A bus carries the data to system RAM, from which a processor retrieves and executes the instructions. The instructions received by the system processor can optionally be stored on a fixed disk either before or after execution by a processor.

Thus, the methods and systems for searching and ranking modifiable videos in MMAs have been described. Although embodiments have been described with reference to specific example embodiments, it will be evident that various modifications and changes can be made to these example embodiments without departing from the broader spirit and scope of the present application. Accordingly, the specification and drawings are to be regarded in an illustrative rather than a restrictive sense.

What is claimed is:

1. A system for searching and ranking modifiable videos, the system comprising:
   a database configured to store modifiable videos, the modifiable videos being associated with text messages and rankings, the text messages being displayed to a user within the modifiable videos upon selecting the modifiable videos by the user, the modifiable videos being modifiable while being played back by dynamically modifying the text messages in the modifiable videos by the user before sharing the modifiable videos by the user; and
   at least one processor and a memory storing processor-executable codes, wherein the at least one processor is configured to implement the following operations upon executing the processor-executable codes:
   receiving, via a multimedia messaging application (MMA), an input of the user, wherein the input of the user is associated with an emotional state;
   selecting, based on the input, a list of relevant modifiable videos from the database, wherein the list of relevant modifiable videos includes modifiable videos associated with the text messages matching the emotional state;
   rendering, via the MMA, the list of relevant modifiable videos for viewing by the user;
   determining that the user has shared, via the MMA, a modifiable video from the list;
   storing an information concerning the list and the shared modifiable video into a statistical log; and
   updating, based on the information in the statistical log, the rankings of the modifiable videos in the database.

2. The system of claim 1, wherein:
   the input includes a category of the modifiable video; and
   the list of relevant modifiable videos includes the modifiable videos matching the category.

3. The system of claim 2, wherein the category is based on at least one of the following: a time a modifiable video was shared via the MMA, a number of times users shared the modifiable video via the MMA, and the emotional state associated with the text message of the modifiable video.

4. The system of claim 2, wherein the list of relevant modifiable videos is updated according to a pre-determined schedule; and
   wherein the updating the list includes:
   filling a pre-determined first position of the list with the modifiable video most recently added to the database; and
   filling rest of positions in the list by the modifiable videos having highest rankings.

5. The system of claim 2, wherein the rankings of the modifiable videos are based on a ratio of a number of times the modifiable video was shared via the MMA to a number of views of the modifiable video by users of the MMA.

6. The system of claim 1, wherein:
   the input includes a search request having at least one keyword;
   the rankings of the modifiable videos are based on the at least one keyword; and
   selecting the list of relevant modifiable videos includes determining, by a search algorithm, a pre-determined number of the modifiable videos with highest rankings.

7. The system of claim 6, wherein a ranking of a modifiable video is based on a weighted sum of a relevance factor, a freshness factor, and a popularity factor, and wherein:

the relevance factor is based on a measure of matching search tags and a search description of the modifiable video to the least one keyword;
the freshness factor is based on a time at which the modifiable video is added to the database; and
the popularity factor is based on a ratio of a number of times users shared the modifiable video via the MMA to a number of views of the modifiable video by users of the MMA.

8. The system of claim 7, wherein weights for the relevance factor, the freshness factor, and the popularity factor are determined by a machine learning model based on historical data from the statistical log.

9. The system of claim 7, wherein the updating the rankings of the modifiable videos includes adjusting one of the search tag or the search description of the modifiable video.

10. The system of claim 6, further comprising adjusting a search algorithm based on historical data from the statistical log.

11. A method for searching and ranking modifiable videos, the method comprising:
receiving, via a multimedia messaging application (MMA), an input of a user, wherein the input of the user is associated with an emotional state;
selecting, based on the input, a list of relevant modifiable videos from a database configured to store modifiable videos, wherein the list of relevant modifiable videos includes modifiable videos associated with text messages matching the emotional state, the modifiable videos being associated with the text messages and rankings, the text messages being displayed to the user within the modifiable videos upon selecting the modifiable videos by the user, the modifiable videos being modifiable while being played back by dynamically modifying the text messages in the modifiable videos by the user before sharing the modifiable videos by the user;
rendering, via the MMA, the list of relevant modifiable videos for viewing by the user;
determining that the user has shared, via the MMA, a modifiable video from the list;
storing information concerning the list and the shared modifiable video to a statistical log; and
updating, based on the information in the statistical log, the rankings of the modifiable videos in the database.

12. The method of claim 11, wherein:
the input includes a category of the modifiable video; and
the list of relevant modifiable videos includes the modifiable videos matching the category.

13. The method of claim 12, wherein the category is based on one of the following: a time a modifiable video was shared via the MMA, a number of times users shared the modifiable video via the MMA, and the emotional state associated with the text message of the modifiable video.

14. The method of claim 12, wherein the list of relevant modifiable videos is updated according to a pre-determined schedule; and
wherein the updating the list includes:
filling a pre-determined first position of the list with the modifiable video most recently added to the database; and
filling rest of positions in the list by the modifiable videos having highest rankings.

15. The method of claim 11, wherein:
the input includes a search request having at least one keyword;
the rankings of the modifiable videos are based on the at least one keyword; and
selecting the list of relevant modifiable videos includes determining, by a search algorithm, a pre-determined number of the modifiable videos with highest rankings.

16. The method of claim 11, wherein:
the input includes a search request including at least one keyword; and
selecting the list of relevant modifiable videos includes performing a search, by a search algorithm, of the modifiable videos having highest rankings of the rankings, wherein the rankings depend on the least one keyword.

17. The method of claim 16, wherein a ranking of a modifiable video is based on a weighted sum of a relevance factor, a freshness factor, and a popularity factor and wherein:
the relevance factor is based on a measure of matching search tags and search description of the modifiable video to the least one keyword;
the freshness factor is based on a time at which the modifiable video is added to the database; and
the popularity factor is based on a ratio of a number of times users shared the modifiable video via the MMA to a number of views of the modifiable video by users of the MMA.

18. The method of claim 17, wherein weights for the relevance factor, the freshness factor, and the popularity factor are determined by a machine learning model based on historical data from the statistical log.

19. The method of claim 17, wherein the updating of the rankings of the modifiable videos includes adjusting one of the search tag and the search description of the modifiable video.

20. A non-transitory processor-readable medium having instructions stored thereon, which when executed by one or more processors, cause the one or more processors to implement a method for searching and ranking modifiable videos, the method comprising:
receiving, via a multimedia messaging application (MMA), an input of a user, wherein the input of the user is associated with an emotional state;
selecting, based on the input, a list of relevant modifiable videos from a database configured to store modifiable videos, wherein the list of relevant modifiable videos includes modifiable videos associated with text messages matching the emotional state, the modifiable videos being associated with the text messages and rankings, the text messages being displayed to the user within the modifiable videos upon selecting the modifiable videos by the user, the modifiable videos being modifiable while being played back by dynamically modifying the text messages in the modifiable videos by the user before sharing the modifiable videos by the user;
rendering, via the MMA, the list of relevant modifiable videos for viewing by the user;
determining that the user has shared, via the MMA, a modifiable video from the list;
storing an information concerning the list and the shared modifiable video into a statistical log; and
updating, based on the information in the statistical log, the rankings of the modifiable videos in the database.

* * * * *